United States Patent [19]

Chiang et al.

[11] Patent Number: 5,278,987
[45] Date of Patent: Jan. 11, 1994

[54] VIRTUAL POCKET SORTING

[76] Inventors: Franklin Chiang, 2452-6 W. Bayshore Rd., Palo Alto, Calif. 94306; Lawrence J. Thoman, 567 Pomona St., San Lorenzo, Calif. 94580

[21] Appl. No.: 664,746

[22] Filed: Mar. 5, 1991

[51] Int. Cl.⁵ .......................... G06F 7/24; G06F 7/08
[52] U.S. Cl. ........................ 395/800; 364/DIG. 2; 364/962.3; 364/963.3; 364/222.9; 395/425; 395/600
[58] Field of Search ................ 364/DIG. 1, DIG. 2; 395/800

[56] References Cited

U.S. PATENT DOCUMENTS

| | | | |
|---|---|---|---|
| 3,602,899 | 8/1971 | Lindquist | 340/172.5 |
| 4,295,206 | 10/1981 | Cain et al. | 364/900 |
| 4,425,626 | 1/1984 | Parmet et al. | 364/900 |
| 4,559,612 | 12/1985 | Vrielink | 364/900 |
| 4,611,280 | 9/1986 | Linderman | 364/300 |
| 4,680,700 | 7/1987 | Hester et al. | 364/200 |
| 4,799,149 | 1/1989 | Wolf | 364/200 |
| 4,809,158 | 2/1989 | McCauley | 364/200 |
| 4,905,188 | 2/1990 | Chuang et al. | 364/900 |
| 4,914,577 | 4/1990 | Stewart et al. | 364/200 |
| 5,117,495 | 5/1992 | Liu | 395/600 |
| 5,121,493 | 6/1992 | Ferguson | 395/600 |

Primary Examiner—Gareth D. Shaw
Assistant Examiner—L. Toplu

[57] ABSTRACT

The present invention sorts very large volumes of data records by forming successive lists of sorted record start address by character rank from a LSD (least significant digit) of a sort field to a MSD (most significant digit) of such field with each list being formed in the order of the preceeding list. The present invention forms the lists by placing record start addresses in a collated list of virtual pockets wherein successive occurrences of like characters are linked to the next pocket memory position of such character so as to form the list in a memory requiring only the same number of addresses as there are records being sorted. The invention thus very materially reduces the size of pocket memory required for this type of data sorting.

2 Claims, 11 Drawing Sheets

VIRTUAL POCKET SORTING

FIELD OF THE INVENTION

The present invention relates to the rapid sorting of very large volumes of electronically recorded data with a material reduction in the memory storage required in the sorting operation.

BACKGROUND OF THE INVENTION

The invention hereof is directly related to and comprises an improvement over my invention entitled "ELECTRONIC SORTING" filed Feb. 19, 1991 and accorded Ser. No. 07/657,120. The disclosure of the above-noted application is hereby incorporated in this application and also with respect to the field of invention.

SUMMARY OF THE INVENTION

The present invention produces the same sorting as the system of the above-noted copending application and is initialized in the same manner. Improvements are provided by the utilization of virtual pockets to reduce required size of memory for sorting, by the provision of a character memory system instead of a pair of controllers to control pocket memories and in the provision of a translator having a controllable or predeterminable logic decision set for expanding the type of sorting or collating sequence from a character set to a wide variety of sets.

The sorting of very large volumes of electronically recorded data in a single sort operation tends to require extremely large memory storage. The present invention provides the capabilities of the invention of above-noted patent application with a reduction in the requisite memory size by many fold. It is herein provided that the physically separate pockets of pocket memories employed in forming the sort lists are replaced by virtual pockets by linking pocket position or location for repetitions of characters. Thus, the memory for each of two "pocket memories" need only have the capability of storing the number of records being sorted instead of the number of records being sorted times the number of characters of the sorting list. This saving of memory is quite significant for large sorting operations as of the order of many millions of records.

The method and system of the present invention incorporates the concept of virtual memories wherein the sorting lists are recorded or entered into alternate pocket memories that are required to accommodate only the same number of addresses as there are records being sorted. It will be appreciated that this concept very materially reduces the amount of memory required for any large sorting operation. With the pocket memories employed in the above-noted copending application, it is necessary for each pocket of memory to accommodate storage of the same number of addresses as there are records being sorted. This is true because any one column of characters in the records being sorted may comprise only a single character.

The present invention provides for linking or chaining of repetitions of each character present by recording or storing not only a record start address, but also the next pocket location wherein the same character is stored.

Considering this virtual pocket concept somewhat further, it is noted that successive addresses from a source pocket memory are only read into the alternative pocket memory upon the second occurrence of a character. In order to accomplish this manner of writing into a pocket memory, thereis herein provided a character memory which records, for each character, the identify thereof, the record start address, the current pocket number, the initial pocket number (INIT-PKT#), and a flag to identify recurrence of such character. Such information for each character is retained in character memory (C-MMY) until the second occurrence of a character, at which point the record start address of the first occurrence of such character is transferred to the receiving pocket memory together with the present pocket number of such character as the next pocket (NXT-P) location of the same character in the receiving pocket memory. In this manner, all of the pockets for any particular character are chained or linked together by means of the next pocket address associated with each occurrence of such character.

Proceeding further with the foregoing, it is noted that at the end of column sort, there will remain in C-MMY the record addresses of all characters which has only occurred once, and the record address of the last occurrence of each character that has occurred more than once. The method hereof then proceeds to backtrack from the last character memory position to successively transfer record start addresses, and next position numbers, into the receiving pocket memory with the highest ranking character having the record start address thereof associated with the next pocket location of the lowest ranking character. This then provides the start position for reading out the contents of the receiving pocket memory at the end of the sorting of the column of characters. Backtracking identifies the most significant character rank of the list of characters used and likewise the least significant rank which then identifies the start position of the next column sort.

BRIEF DESCRIPTION OF DRAWINGS

The present invention is illustrated with respect to preferred embodiment thereof in the accompanying drawings, wherein.

DESCRIPTION OF PREFERRED EMBODIMENT

The present invention provides an improvement in sorting of data wherein two pocket memories are alternately employed as source and destination pocket memories for storing column lists of record addresses corresponding to character addresses in successive columns of records in data memory (D-MMY) in accordance with my invention of U.S. patent application Ser. No. 07/657,120 entitled "Electronic Sorting". The characters of successive stored records of data at the same number of characters from the start of each record are considered to form a column and successive columns from least significant character (LSC) to most significant character (MSC) in any field or part thereof are sorted by a predetermined character rank to form sort lists of record start addresses with each column being sorted in the order of addresses in the proceeding list.

Sorting of one column of characters is accomplished in one memory cycle per character and thus in general, there are as many memory cycles as there are characters in a column. By the use of multiple memories, the present invention provides for reading out of one memory while writing into another memory so that sorting of each character called out of D-MMY occurs in one memory cycle. Full pipeline operation is provided herein. Input data to be sorted contains information such as number of records (RCDCNT), offset key position numbers, character collating sequence, and record length (RL), or record end markers for records of different length, together with command words. The foregoing information is employed for initializing the system, as set forth in detail in my above-noted co-pending patent application.

Figure 1:
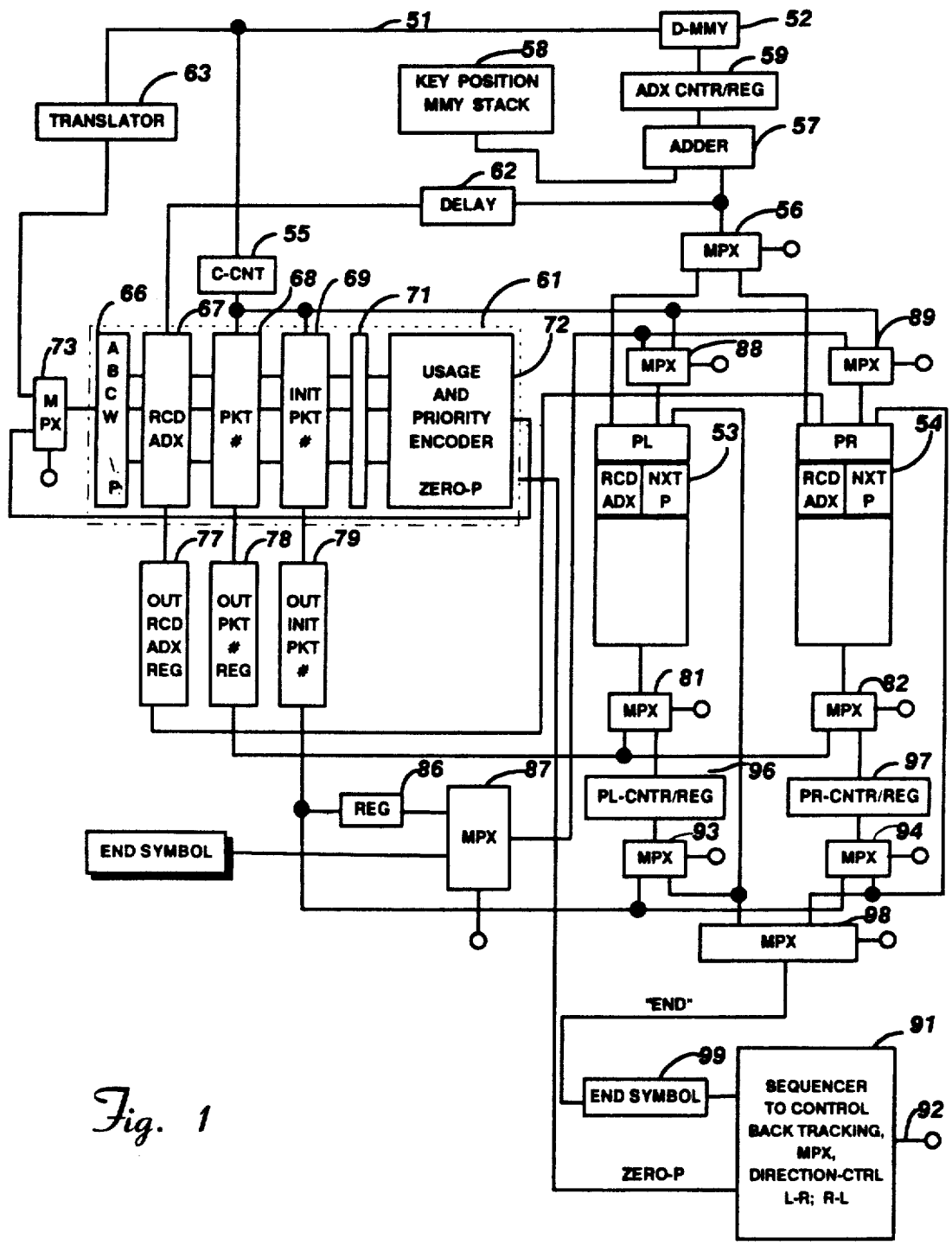
FIG. 1 is a pictorial representation of a sorting system in accordance with the present invention.

Reference is made of FIG. 1 of the drawings thereof schematically illustrating a layout of the system of sorting, and in this respect reference is also made to my above-noted copending patent application Ser. No. 07/657,120, File No. 523 for details of circuitry. Input data is received upon a data bus 51 and after initialization of the system data is read into D-MMY (data memory) 52, and at the same time record start addresses of such data are read into and stored in the record address (RCD-ADX) portion of a first pocket memory 53 (PL) that is associated with a second pocket memory (PR) 54, as further described below. Outputs of the pocket memories 53 and 54 are alternatively applied through a multiplexer 56 to adder 57. A key position memory stack (KPS) 58 has the input thereof connected to Data Bus 51 and an output connected as the other input of the adder 57. An address counter register 59 receives the output of the adder 57, and is connected to D-MMY 52 to output successive characters stored therein from the addresses identified at the address counter register. A character counter 55 is connected between the output of D-MMY 52 and the pocket memories 53 and 54 an is reset at the end of each column sort.

The system illustrated in FIG. 1 additionally includes a character memory system which includes control and internal logic functions and is herein termed C-MMY. C-MMY 61 has the input thereof connected through a character translator 63 to D-MMY 52 and is operable each time that a character is outputted from D-MMY. The character translator 63 is initially commanded to establish the rank of character collating sequence, or any enscripted sequence by directing separate characters from D-MMY to predetermined C-MMY addresses. The translator is controllable to establish predetermined logic decision sets for setting the collating or sorting sequence and to produce signals (normally binary) for application to C-MMY in accordance therewith. The translator provides for selection of one of a multiplicity of character sets such as A to Z or Z to A, or any other type of collating sequence. The C-MMY 52 and the Translator 63 are preferably of Static Ram type which is extremely fast, and operates, for example, at the rate of twenty times as fast as D-MMY and the pocket memories 53 an 54, which may comprise D-Ram. Consequently, there is provided a synchronizer or buffer unit 62 connected between the output of the pocket memories and a RCD-ADX input of the C-MMY to synchronize the RCD-ADX from the pocket memories 53/54 and the Translator 63 output to the C-MMY 61.

Considering further the C-MMY 61, it will be seen that same includes a first portion comprising a character address unit 66 connected to a record address memory (RCD-ADX) 67, a pocket number memory (PKT#) 68 and initial pocket number memory (INIT-PKT#) 69, and flag memory 71. The output of the foregoing is connected to a usage and priority encoder 72, or the equivalent thereof, which has the output thereof connected back to an input of C-MMY 61, as further described below. The output of usage and priority encoder 72 and the output of translator 63 are applied through a MPX 73 to the input of C-MMY. The memory units 67, 68 and 69 are each connected to registers 77, 78, and 79 respectively which are collectively termed C-REG below. The output of address register (ADX-REG) 77 is connected to the inputs of record address portions (RCD-ADX) of pocket memories 53 and 54. The output of the pocket number register (PKT-REG) 78 is connected to one input of each of two multiplexers connected to separate pocket memories PL and PR. The output of the INIT-PKT#-REG is applied through a further register 86 to one input of a MPX 87 having the other input as an END symbol. The output of the MPX 87 is applies as one input of each of separate multiplexers 88 and 89 which have the other inputs connect to the character counter or count register (CNT-REG) 55, and the outputs separately connected to pocket memories PL and PR. It will thus be seen that the NXT-P portions of PL and PR receive the character count numbers or the output of the initial pocket register, or END symbol as described below.

The present invention additionally, includes a sequencer 91 for direction control, controlling backtracking and for controlling the MPXs hereof. It is noted that at this point that the illustration of FIG. 1 includes a plurality of units identified as MPX and this terminology is herein employed to represent the function of controlling numerous signals directed to a single destination, and may actually comprise any signal switching device desired. The sequencer 91 has an output 92 connected to control each of the MPXs of FIG. 1, and is in turn controlled by successive "end of sort" in the sorting of columns of data. The NXT-P portions of pocket memories PL and PR are read out to the inputs of MPXs 93 and 94 having the outputs connected respectively to a PL counter register 96 and a PR register 97. The counter portion of register 96 is only required during initialization of the system during loading of PL. These registers 96 and 97 are connected to MPXs 81 and 82 respectively, and it will also be noted that the output of the C-MMY INIT-PKT#-REG 79 is connected to inputs of the MPXS 93 and 94. Thus, a pocket memory applies a NXT-P signal through a MPX and register and a second MPX to address the NXT-P in the pocket memory. Alternatively, the INIT-PKT#s are applied from register 79 to PR during backtracking, as discussed below. The outputs from the NXT-P portions of memories PL and PR are also applied to a MPX 98, having the output applied to an END detector 99, connected to an input of sequencer 91. Another input to the sequencer 91 is obtained from a zero priority output of the usage and priority encoder to identify end of backtracking.

The functions of the various portions of the present system are generally indicated in FIG. 1, and described above, however, the concepts of the present invention may be best understood by considering an actual sort operation as set forth below.

The present invention relates to the formation of sort lists from the characters of successive columns of recorded data in accordance with command signals, and in order to fully disclose and explain the method and system of the present invention, there follows an explanation of a very simple example wherein the elements and functions of C-MMY are coordinated with the 5 pocket memories to link or chain characters in the latter in virtual pockets whereby the number of addresses required in each of the pocket memories 53 and 54 need only equal the total number of records being sorted. In this respect, it is noted that the first pocket memory 53 is herein denominated PL and the second pocket memory 54 is denominated PR, with it being understood that PL initially receives the record start addresses of each of the records feed into D-MMY 52 and that the NXT-P portion of PL associates with each record address with the location of the next record address. This is accomplished during initialization of the present invention, and it is further noted at this point that the present disclosure does not attempt to reiterate the steps of or connections for initialization of sorting in accordance herewith, inasmuch as same is fully set forth in the above-noted copending U.S. patent application.

Figure 2:
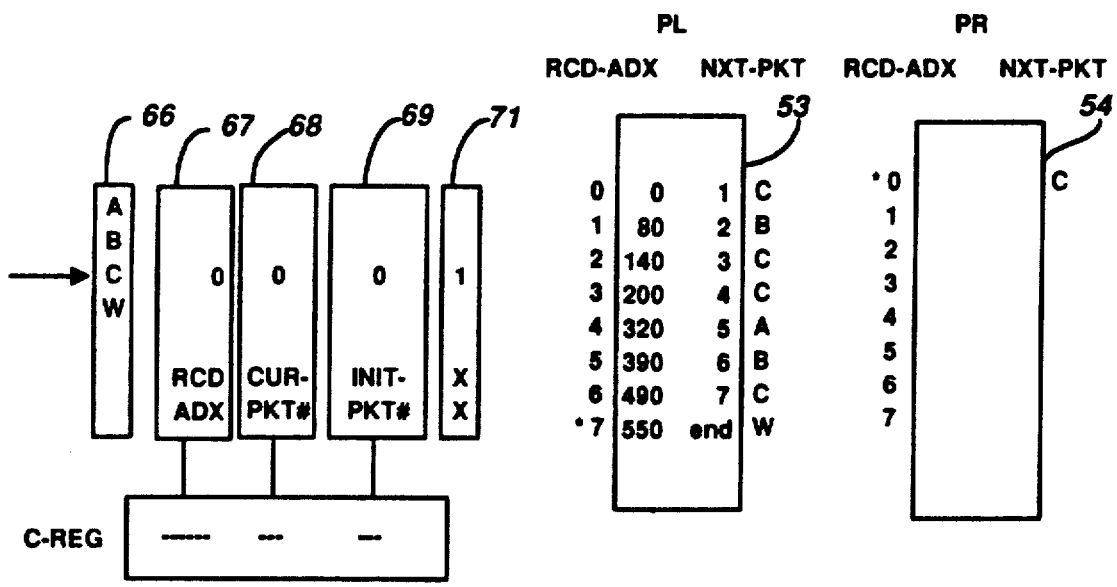
FIGS. 2 through 10 are pictorial representations of successive steps in the method hereof as applied to a simple example for clarification of the virtual pocket memory concept for sorting.
Figure 3:
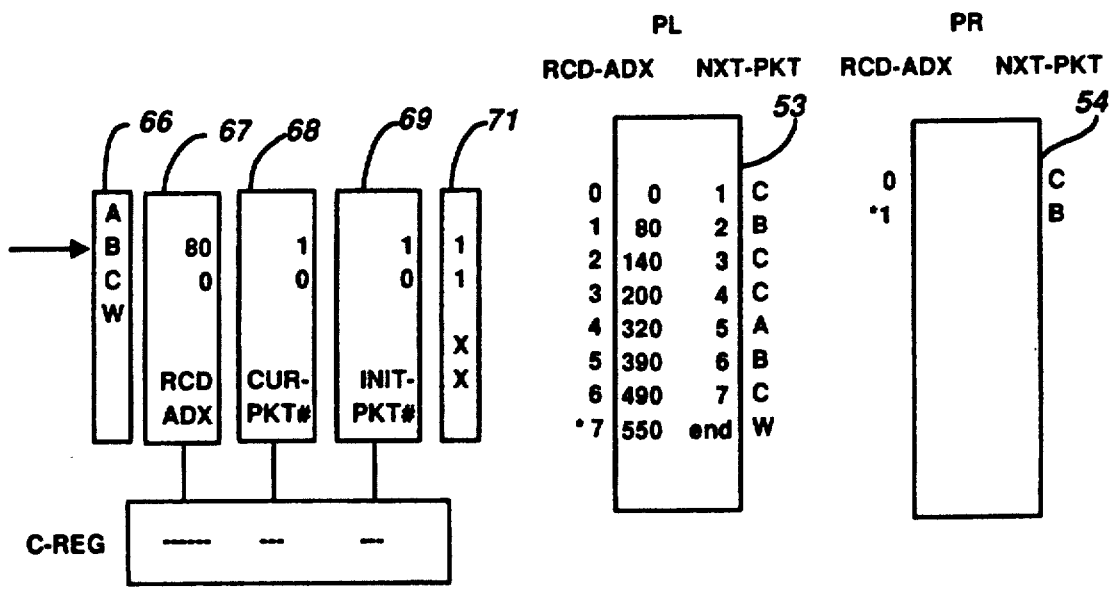

Considering now an actual sorting operation in accordance with the present invention, it is noted that the system is initialized so the D-MMY 52 and KPS 58 are loaded, and each of the record start addresses in D-MMY are loaded into the record address column of the left or source pocket memory 53, herein termed PL. It is to be noted that KPS contains a series of numbers which represent the "offset numbers" or number of character from record start address to each column of record characters for sorting in predetermined sequence from input command words. Adding of an offset number to a record start address identifies the address of a character that is to be sorted in a column sort. The first sorting operation is carried out for the least significant character, LSC, of the first key column of the records stored in D-MMY. In the following example, it is assumed that he LSC of this column contains the sequence of characters C, B, C, C, A, B, C, W. In FIG. 2 of the drawings, PL is shown to be loaded with record start addresses of eight records to be sorted with the record start addresses RCD-ADX being zero, 80, 140 etc. to 550, stored in pocket memory positions or pockets 0 through 7. These record addresses are each associated with a next pocket number NXT-P, indicating the succession of addresses or positions for the first sort list or operation. This is indicated at NXT-P of PL in FIG. 2. For ease of explanation, the above-noted characters column are shown to the right of PL and PR in FIG. 2, although it will be appreciated that these characters themselves do not appear in PL inasmuch as the present invention operates only to sort data by manipulating record start addresses instead of the data itself. Thus, these letters are provided only as a comment. It will also be noted from FIG. 2 that the second pocket memory PR has no information written therein at this time.

Sorting is initiated by reading out the first record address (RCD-ADX) from pocket memory PL and adding to it the first key position stack (KPS) value which identifies the LSC of the key column employed for sorting. This sum is the actual column address of the first record in D-MMY from which a character is read out, and such character is translated by the character translator into binary form, and applied to the input of C-MMY. In the example set forth above, this first character is "C" from the LSC column of data record [0]. C-MMY 61 is thus addressed at location C to write into corresponding positions the record address of 0, pocket number of 0 and initial pocket number 0, and a flag of one indicating that this character has been received. The pocket numbers are obtained from C-CNT. Of particular note at this stage, is the fact that nothing is written into the destination pocket memory PR until the same character appears the second time, or the end of column occurs, i.e. until the NXT-P information becomes available.

The second character read out of D-MMY 52 is "B' from the LSC column of data record [1] of the key column being sorted. Thus, C-MMY is addressed at location B, and the memories of C-MMY are written with record address equal 80, pocket number equal 1, initial pocket number 1 and flag of 1. Again, nothing is written in pocket memory PR because this is the first occurrence of character "B".

Following the foregoing example, it will be seen that the third character read from D-MMY is a "C" from the LSC column of data record 2 so that C-MMY is addressed at the location C.

Figure 4:
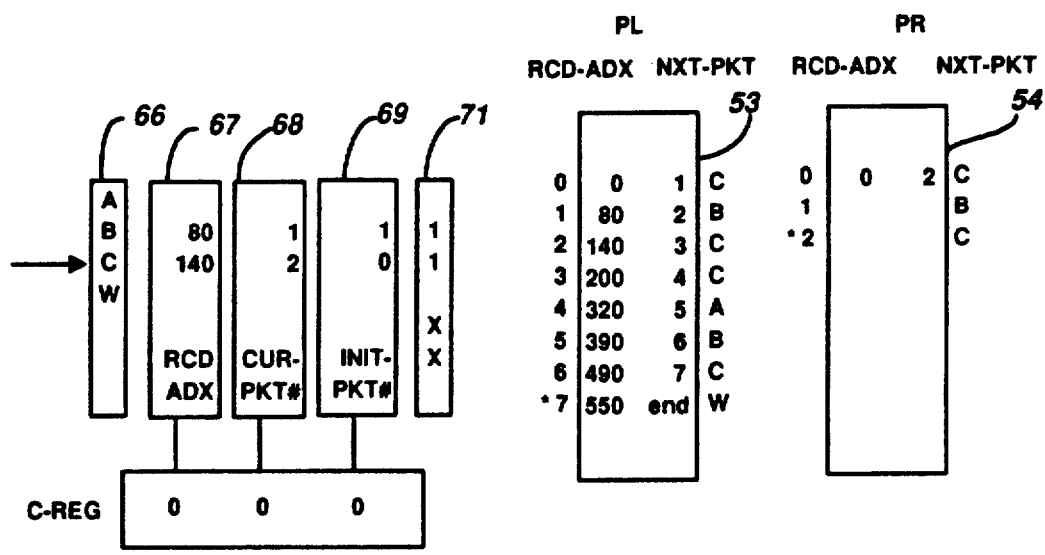

The presence of the FLAG=1 at the address location of C-MMY indicates that the current character is not the "first occurrence", and in this circumstance the contents of C-MMY at this location is transferred to C-REG as indicated in FIG. 4, and the record address is written therefrom into the destination pocket memory PR RCD-ADX column. At the same time the current character count C-CNT is written into the NXT-P column of PR, again as indicated in FIG. 4. It will be seen that the previous pocket of the same character or current character is not filled or written into PR until the re-appearance of such character. When this previous pocket is filled, the associated NXT-P location has the current pocket number filled in so as to link or chain the previous pocket for this character to the current pocket which will eventually be filled with the record address of the same character. In addition to the foregoing, the current record address from the source memory PL written into C-RCD-AXD memory 67, and the C-CNT is written to the current PKT#68, as indicated in FIG. 4.

Figure 5:
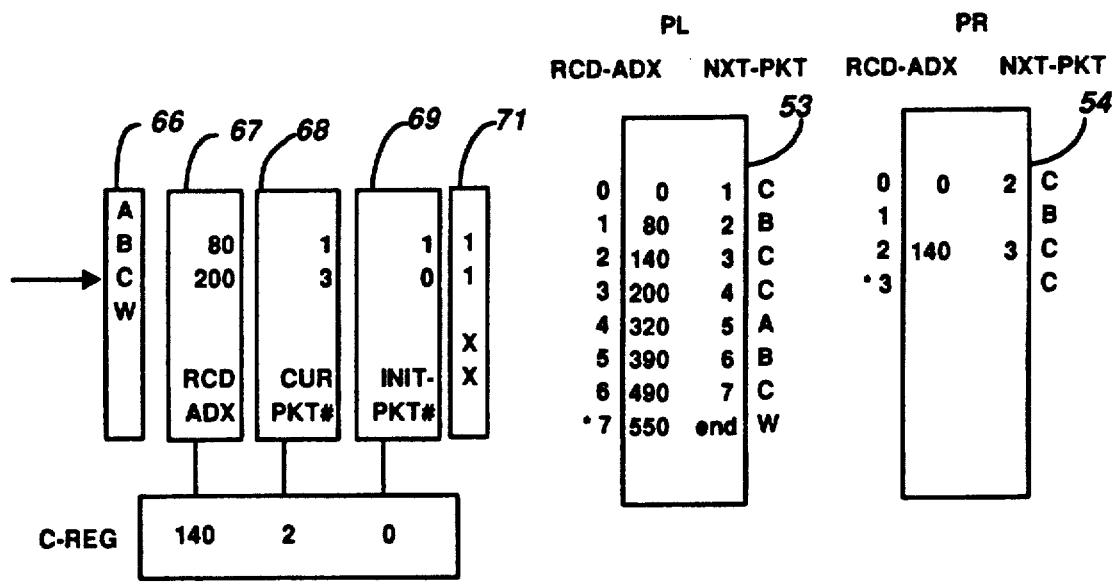

The next incoming character is another "C" which again addresses the C-MMY wherein the presence of the FLAG=1 indicates that the current character is not the first occurrence so that the contents of C-MMY thereat is transferred to C-REG, as indicated by the numerals 140, 2, 0 in FIG. 5. The record address 140 is then written into destination pocket memory PR at pocket number 2 number 2 and a current C-CNT is written into the NXT-P column of PR at the same location. This then provides for linking or chaining the record address 140 of the C at position of pocket number 2 of PL to pocket number 3 thereof. C-MMY is also written into with the new record address 200 with current pocket number 3. The initial pocket number 0 and a FLAG=1 are retained.

Figure 6:
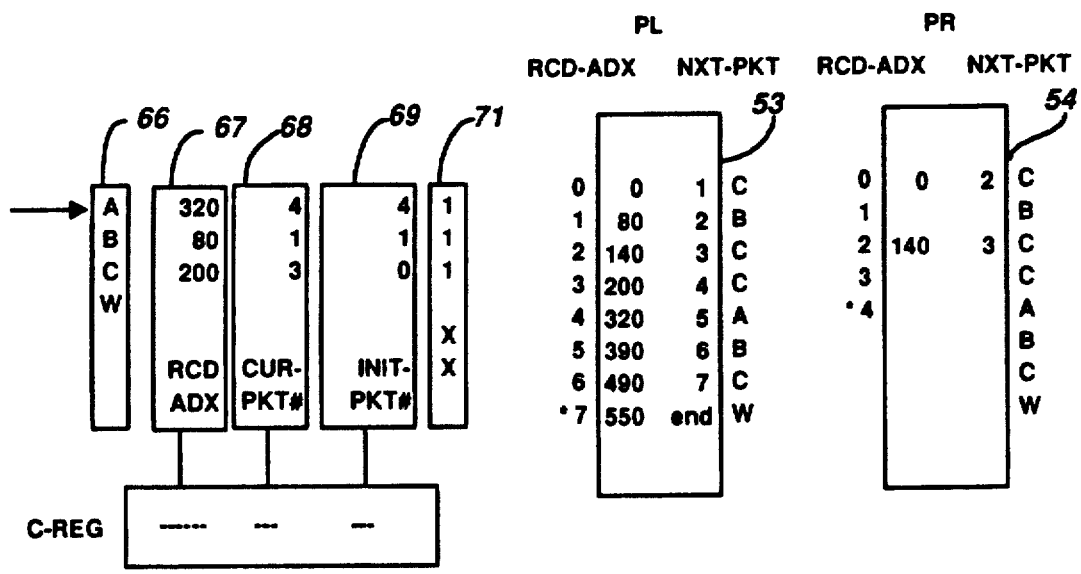

The next or fifth character read from data memory is an "A' which will be seen to be the first occurrence thereof so that nothing is written into the destination memory PR. C-MMY is addressed with the character "A", and the record start address of the fifth record, i.e., 320 is entered into the record address portion of same memory, the character count entered into the CUR-PKT# as the numeral (4), the record count minus one inasmuch as current count starts at (0), and the initial pocket number is entered as a 4, inasmuch as this is the first character "A" received, and FLAG=1. See FIG. 6.

Figure 7:
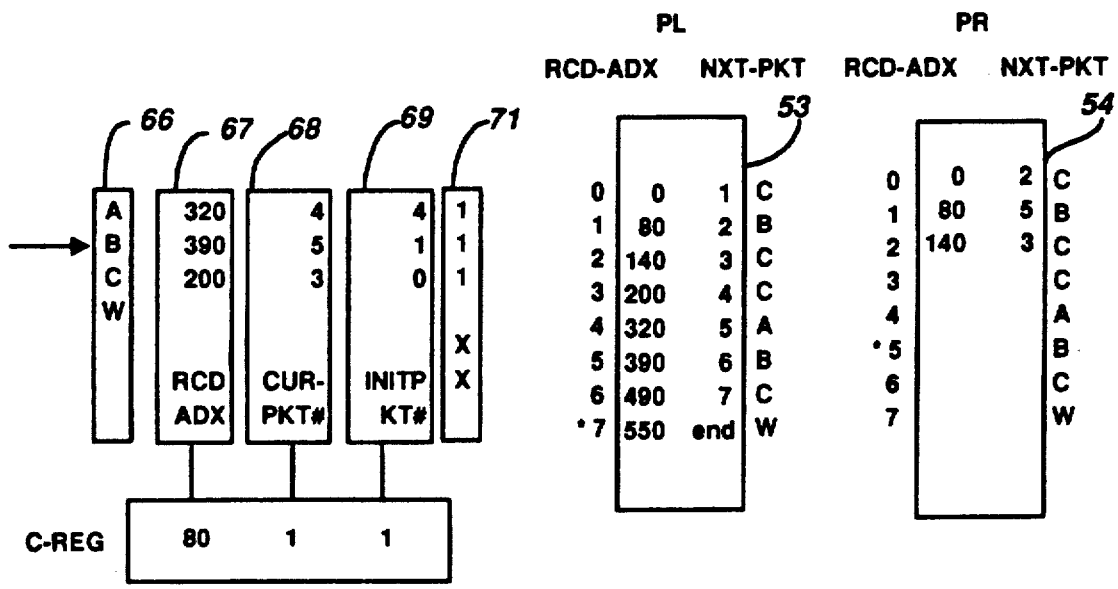

The sixth character in the illustrated example is a "B" which will be seen to not be a first occurrence so that the same procedure occurs as described above with respect to FIG. 4, wherein the character "C" recurred. Thus, entry of the character "B" in C-MMY causes the existing information at "B" location to be transferred to C-REG, as indicated at FIG. 7, and for the current information regarding this character to be entered in C-MMY. Thus, the record address of 390 is written into the record address portion of C-MMY, the current pocket number of five is written as indicated, and initial pocket number one retained. The record address is written into destination memory PR at pocket location 1 at indicated in FIG. 7, and the next NXT-P from current C-CNT=5 is also written in this location. It will be seen that in this manner, location or pocket number 1 of destination memory PL is linked to pocket number 5 wherein the same character re-occurs.

Figure 8:
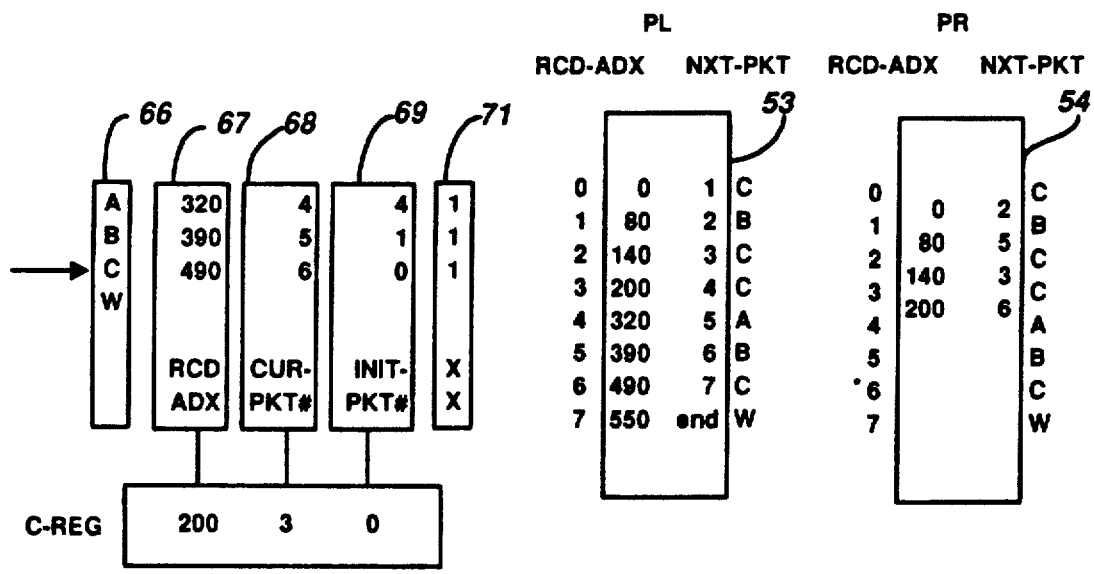
Figure 9:
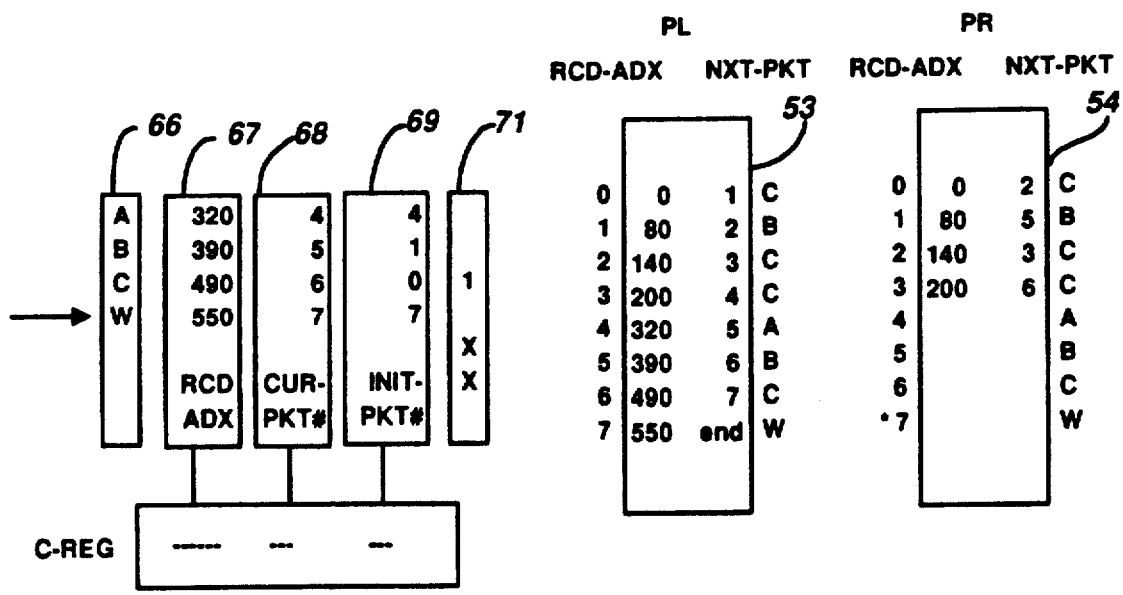

Following the foregoing example, the next or seventh character is a "C" which is not the first occurrence thereof, and thus the same procedure is followed as described above for reoccurrence of a character and as indicated in FIG. 8.

The eighth and final character in the foreging example is a "W" which is a first occurrence thereof. Consequently, nothing is written into the destination memory PR, however, the record address 550 is written into record address portion of C-MMY, a 7 is written into current pocket number portion of C-MMY and the same number is written into the initial pocket number, with a FLAG=1 being also written. In the present example the last character in a column has an END marker entered therewith in PL, as indicated, to denote end of column, however, the end of column may be otherwise indicated by a separate END signal at the last address of a column, for example.

It will be appreciated that pockets 0, 1, 2 and 3 of destination memory PL have been written into up to this point, and that the remaining information is located in C-MMY. The present sorting system then proceeds in a backtracking mode to properly insert into destination memory the record start addresses for characters stored in C-MMY while appropriately linking pockets in the pocket memory, and establishing the start pocket for the sort list then stored in the destination pocket memory.

It will be noted that, as shown in FIG. 8, first four pockets of the source pocket memory PR have been written into, and that there remains in C-MMY four record addresses and associated information. These remaining characters comprise "A" and "W" inasmuch as such characters have not been repeated in sorting of the column and "B" and "C" which are the last occurrence of these characters in the first key column. At the end of column sort the usage and priority encoder 72, or some equivalent circuitry, produces an output signal corresponding to the highest collating rank character used, applies same back to an input of C-MMY. In this instance, the character is "W" so that the RCD-ADX 550 is written into pocket number 7 of destination memory PR in accordance with the information contained in C-MMY. In addition to the foregoing, the usage and priority encoder 72 produces a "zero priority" signal which identifies the initial pocket number of the least collating rank character stored in C-MMY which is a "4", and this is written into NXT-P of pocket 7. Also, this PKT# "4" is applied to PR as the start location or pocket number for read out of PR when PR becomes the source memory during the next column sort.

At the time the address for the highest collating character used is read out of C-MMY, the FLAG is erased or changed to zero.

The usage priority encoder successively inputs to C-MMY the remaining characters stored therein from the highest rank to the lowest character used. Thus, the address for the character "C" is read out of C-MMY, and writing into pocket memory PR at the pocket number associated therewith in C-MMY, i.e., pocket number 6 in this example. In addition, the initial pocket number of the proceeding character read out of C-MMY, in this case number 7, is written into pocket memory PR as the NXT-P location in pocket number 6 thereof.

Figure 10:
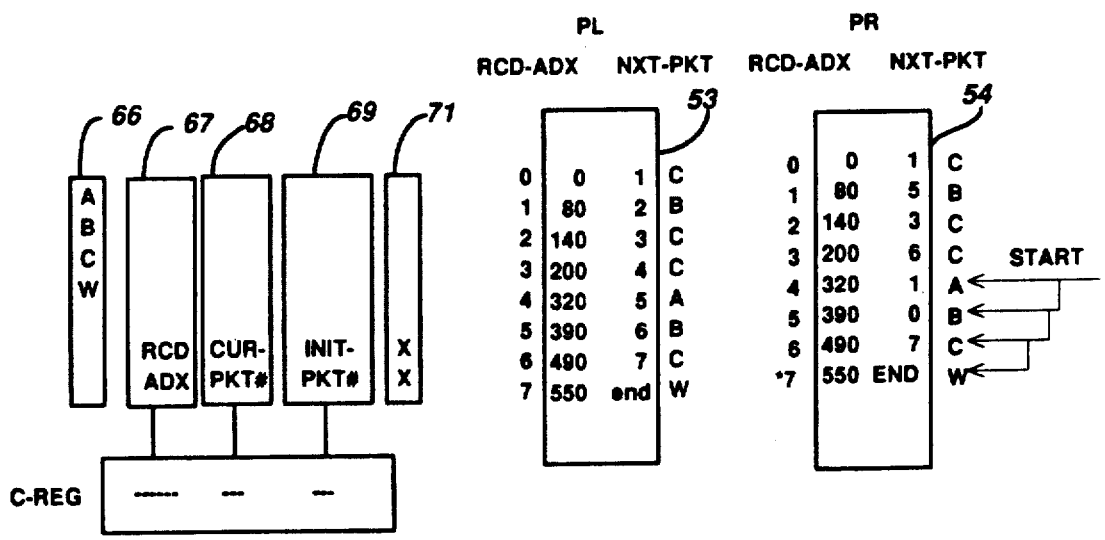

It will be seen that the foregoing operation produces in the destination pocket memory PR a sort list of FIG. 10 with the NXT-P Column of numbers 2, 5, 3, 6, 1, 0, 7, END. This sort list starts at pocket number 4 to provide a sorting list for the next LSC column of the key column wherein the PR memory becomes a source memory and the PL memory becomes a destination memory. Considering this source list in PR, it will be seen that the list starts at pocket 4 which represents a character "A", because "A" is lowest ranking thus column sort and in accordance with the list then goes to pocket 1 which is a "B", and to pocket 5 which is a "B". This list continues from pocket 5 to pocket 0 which is a "C", to pocket 2 which is a "C", to pocket 3 which is a "C", to pocket 6 which is a "C", and to pocket 7 which is a "W". Thus, the record addresses of the next LSC of the sort field will be sorted in an alphabetical order in accordance with the list formed by the sorting the of LSC of the column sorted. This then accomplishes the sorting operation set forth in the above-noted copending U.S. patent application.

As noted the above, the present invention operates to sort data by placing record start addresses in a first sorted order in accordance with the character set for the LSC of the sort field. The next LSC in the sort field of each record is then sorted in accordance with the sort list formed by the first column sort. The foregoing is accomplished by moving record addresses back and forth between pocket memories PL and PR, which alternate as source and destination memories. The present invention also embodies the concept of virtual pockets wherein entries in a pocket memory are linked to other pockets storing a record address of the same character. This linking operation is carried out by C-MMY which retains the address of a character until the character reccurs or repeats, or the end of column occurs. The record addresses remaining in C-MMY when all characters of a column have been read out of D-MMY are then transferred to destination pocket memory in a particular order in that location, as described above, to complete the formation a of sort list in pocket memory for an individual column of characters in D-MMY.

Figure 11:
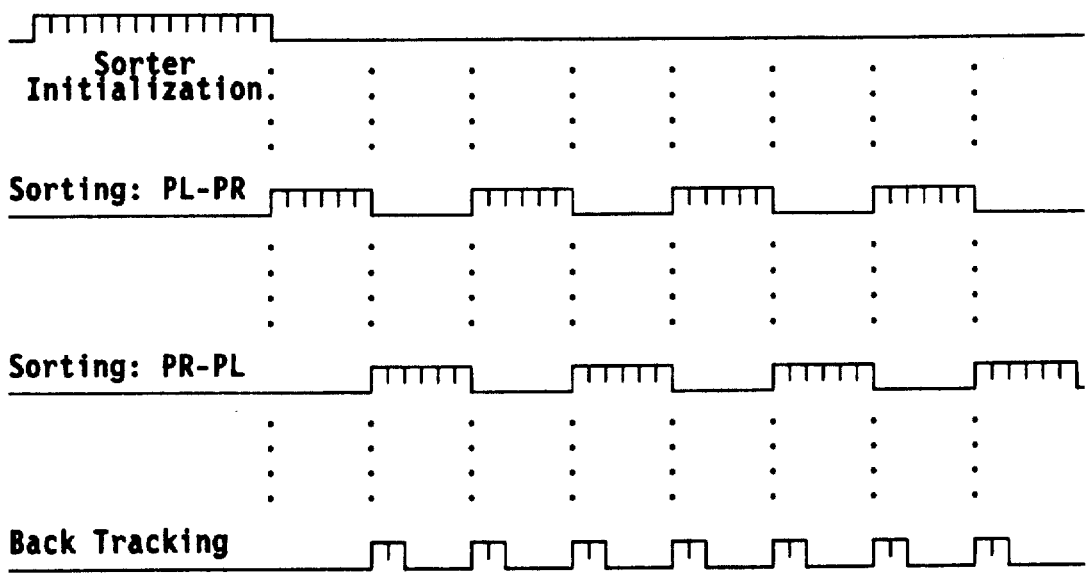
FIG. 11 is a sequence diagram of a sorting operation in accordance with the present invention.

FIG. 11 of the drawings illustrates a sequence diagram wherein the top line A has a raised portion 111 indicating a period of initialization of the invention which includes among other things the loading of D-MMY, and reading of the record start addresses of a first column sort into the record address portion of source pocket memory 53 together with the NXT-P numbers in the succession of records. Line B of FIG. 11, illustrates at 112 sorting operations from left to right as indicated by L-R in the figure wherein data records from PL are sorted into a sort list in PR. Line C of FIG. 11, illustrated alternate sorting operations wherein record addresses in PR as the source memory are sorted into a sort list in PL, as the destination memory. This is indicated by the numerals 113 in FIG. 11, line C. The remaining illustration at Line D of FIG. 11, illustrates at 114 the backtracking operations during successive sort operations, and it will be seen that backtracking occurs during the later part of each sort operation. The length of the backtracking operation depends upon the number of characters in C-MMY, and is variable from a single character to the complete character set.

As noted above, the present invention operates to sort a character for each memory cycle of the system. There are not delays, and in addition, records address are read out of and into C-MMY in a single memory cycle of the pocket memories. During each D-MMY and PL-PR MMY cycle multiple layers of operations take place concurrently so that one character from each column is sorted at each memory cycle. This then provides a full pipeline effect.

At the end of sort when all columns identified in the key position memory stack 58 have been sorted, there will remain in the final destination pocket memory a sort list by means of which data in the D-MMY 52 may be read out in sorted order. Details of readout are not included herein, inasmuch as they are described in my above-noted co-pending patent application. It is, however, noted that the sequencer 91 of the present invention receives a signal denoting end of column from the detector 99, and subsequently receives a zero priority signal from the usage and priority encoder 72 when the last entry in C-MMY is read out, i.e., when the backing tracking mode has been completed. This then causes the sequencer 91 to reverse the pocket memories 53 and 54 so that PR becomes the source memory and PL the destination memory. Additionally, the sequencer 91 operates through the terminal 92 to switch the multiplexers of the system, and it will be seen that this causes MPX 87 to insert the END signal or marker into the destination memory at the NXT-P column of the last pocket written into. It is believed that operation of other multiplexers are apparent from the connections thereof, inasmuch as they serve to complete the alternation between pocket memories from read into to write out, and vice versa.

From the foregoing, it will be seen that the present invention provides for storing record start address in virtual pockets of pocket memories through the use of C-MMY wherein pockets in pocket memories are linked together or pointed one to the other to identify pockets containing the same character and the next highest rank character. This establishment and use of virtual pockets provides a very material reduction in the required capacity of the pocket memories, for it is only necessary that these pocket memories have as many pockets as there are records being sorted. Successive characters in a column are written into the destination memory until the column is completed, and the invention provides for linking pockets in the destination memory so that record addresses stored therein will be read out in the source list order established therein.

Although the present invention has ben described above with respect to a particular preferred embodiment thereof, it will be appreciated by those skilled in the art the numerous modifications and variations are possible within the scope of the present invention, and thus it is not intended to limit the invention to the precise terms of description or details of illustration.

What is claimed is:

1. An apparatus for sorting records of one or more characters stored in a data memory, comprising:
   a pair of source and destination memories having a numbered sequence of pockets for storing in each pocket an address and a pointer to a next pocket,
   a character memory having a corresponding location for each character in a collating order of characters, each location for storing an address,
   means for successively reading out an address from the source memory by following the pointers and selecting a character of a record stored at the address in the data memory,
   means for translating the character into a location in the character memory and storing the address in said location,
   means for reading out the address from the character memory only after an initial occurrence of the character and writing into a pocket in the destination memory, destination pocket number of a current occurrence of the character with an address of an immediately preceding occurrence of said character,
   means for reading the character memory in a descending order while linking addresses of initial occurrences and addresses already present in the destination memory.

2. An apparatus for sorting records of one or more characters stored in a data memory, as in claim 1, further comprising:
   means for connecting the pair of memories to alternately serve as source and destination memories, and
   means for resetting the character memory.

* * * * *